United States Patent [19]

Balcom

[11] 4,013,991
[45] Mar. 22, 1977

[54] FISH LOCATOR

[75] Inventor: Orville R. Balcom, Lomita, Calif.

[73] Assignee: Cetec Corporation, Santa Ana, Calif.

[22] Filed: Feb. 13, 1976

[21] Appl. No.: 657,731

[52] U.S. Cl. .............................................. 340/3 C
[51] Int. Cl.² ............................................. G01S 9/70
[58] Field of Search .................................. 340/3 C

[56] References Cited

UNITED STATES PATENTS 3,267,413  8/1966  Beebe et al. ...................... 340/3 C Primary Examiner—Richard A. Farley
Attorney, Agent, or Firm—Harris, Kern, Wallen & Tinsley

[57] ABSTRACT

An ultrasonic depth indicator having an ultrasonic transducer suitable for mounting on a boat, transmitter, receiver and rotating indicator, with transmitted echoes producing receiver output pulses for energizing the indicator, with the angular distance between indicator pulses providing a measure of depth of the item producing the echo. A synchronization signal source for operating the transmitter in synchronism with indicator rotation. A logic circuit, typically a bistable flip-flop, having the transmitter trigger signal as an input and producing an inhibit signal as an output for inhibiting transmitter and receiver operation during predetermined revolutions of the indicator.

3 Claims, 5 Drawing Figures

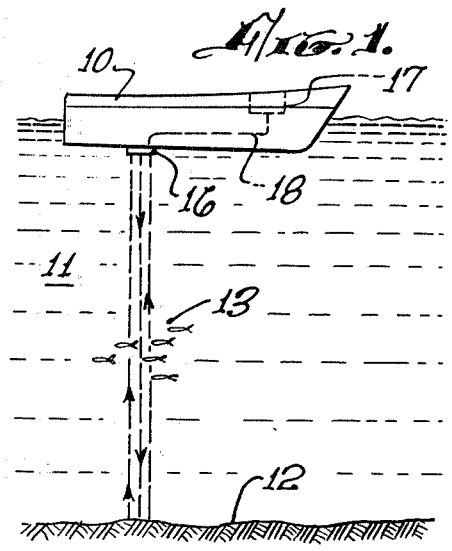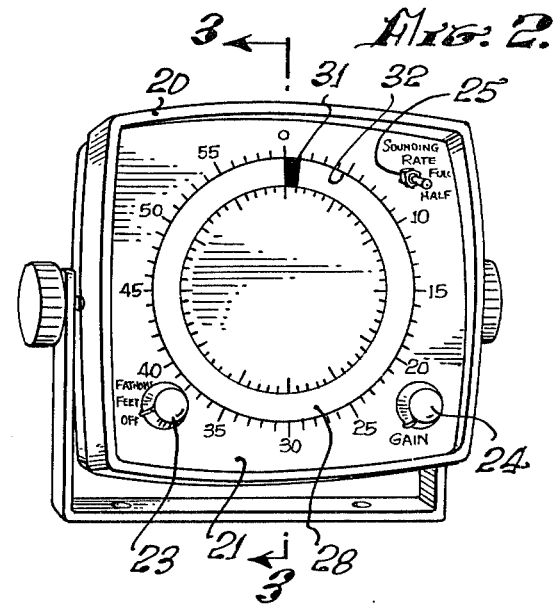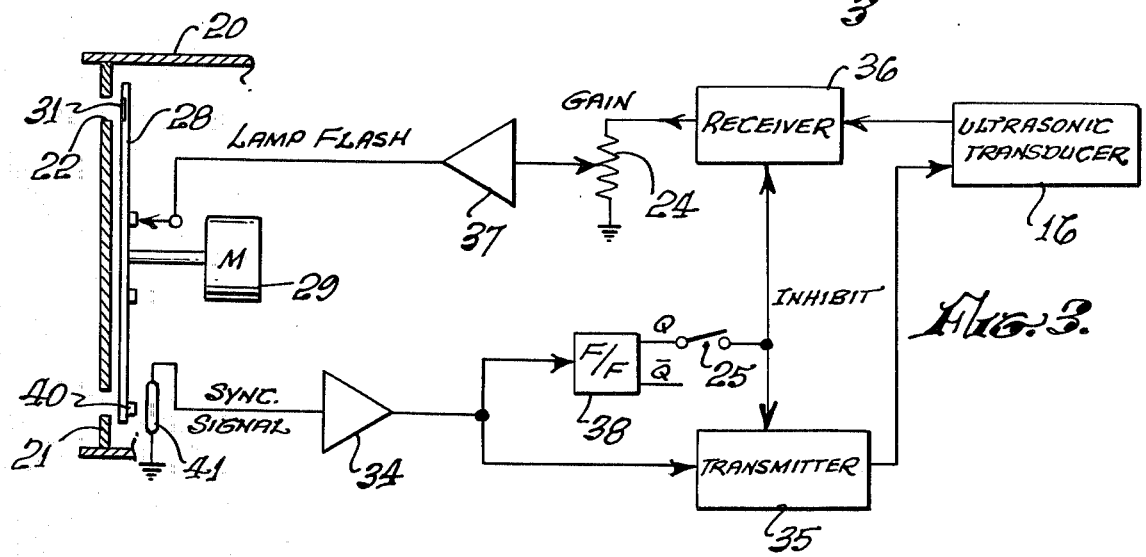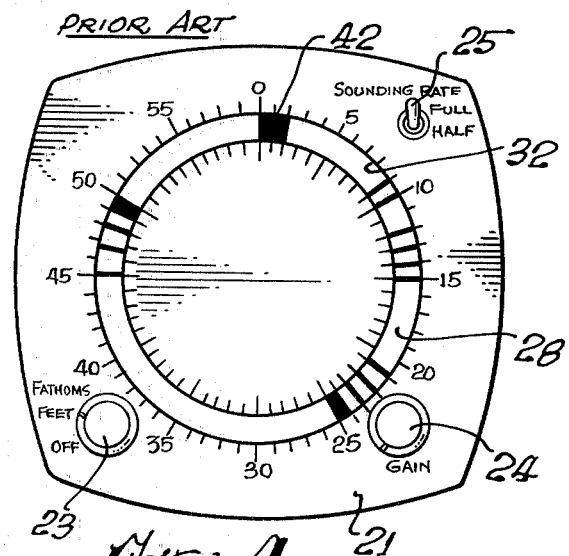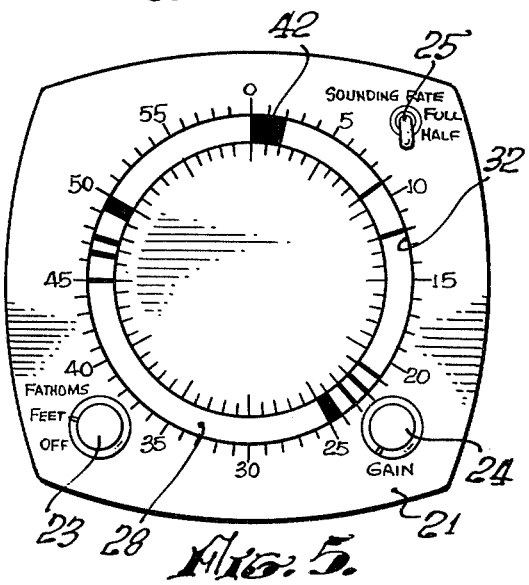

FISH LOCATOR

BACKGROUND OF THE INVENTION

This invention relates to ultrasonic depth indicators and in particular, to a new and improved depth indicator particularly suited for locating fish. The ultrasonic depth indicators presently in use have an ultrasonic transducer carried on a boat for transmitting and receiving pressure waves in the water. An electrical transmitter provides an electrical pulse to the transducer which in turn produces the pressure wave in the water. This pressure wave is reflected by various objects in the water and these echoes are received by the transducer and converted to electrical signals directed to a receiver.

The depth indicator includes a display having a rotating member, typically a wheel carrying a lamp, and the receiver output is used to energize the lamp, causing the lamp to flash at predetermined locations in a revolution of the wheel. The display may be marked off in feet or fathoms or otherwise as desired, providing a visual display of the depth at which the echo is produced. Instruments of this type are in general use today.

However there are disadvantages with the current equipment which causes ambiguous displays and masks desirable information. Where the time interval for the travel of the ultrasonic pressure pulse from the transducer to the bottom and return is greater than the time interval between pulses, the echo from the first pulse will be displayed after the transmisson of the second pulse and will appear to be from a much shallower depth than actually is the fact. For example, if the depth indicator indicates depth from 0 to 60 feet, an echo from an 80 foot bottom will be indicated as being from a 20 foot bottom.

Also, where the bottom is a good reflector, the transmitted pulse can bounce back and forth between the bottom of the body of water and the surface of the water or the bottom of the boat one or more times providing a plurality of indications at multiples of the actual depth. For example, if the depth is 25 feet, displays will be provided at 25 feet, 50 feet and 75 feet. With the depth indicator previously mentioned having the 0 to 60 foot display, these three echoes would produce displays at 25 feet, 50 feet and 15 feet.

These modes of operation are undesirable because they give erroneous indications of bottom depth. Also, the displays will mask other echoes such as those produced by fish. For example, when operating with the 60 foot indicator in 80 feet of water, the echo from the bottom will mask echoes from fish at about 20 feet. Similarly, when receiving multiple echoes from a 25 foot bottom, fish at 15 feet will be masked. In the past, multiple echoes have been reduced by reducing the gain of the system. However this is undesirable because echoes from fish normally are of lower energy than echoes from the bottom and hence reducing gain causes a loss of the fish echo.

It is an object of the present invention to provide a new and improved depth indicator which can eliminate the ambiguities and errors discussed above while permitting operation at full gain so that fish echoes are not lost nor masked.

SUMMARY OF THE INVENTION

The present invention provides a modification of the conventional ultrasonic depth indicator. The synchronizing signal produced each revolution of the rotating display wheel in the conventional depth indicator is used to trigger the transmitter. In the present invention, a logic circuit is added to produce an inhibit signal for inhibiting operation of the transmitter and receiver. In the preferred embodiment, a bistable logic circuit is used with the transmitter trigger signal as an input and providing an inhibit signal as an output for every other transmitter trigger signal. During the first revolution of the display wheel, the operation is the same as for the standard instrument. However there is no transmitted pulse during the second revolution and no display pulses from the receiver. Therefore no ambiguous or erroneous displays are produced during the second revolution. The operation is normal during the third revolution. However since there was no transmitted pulse for the second revolution, there will be no delayed echoes from the second revolution for display during the third revolution.

BRIEF DESCRIPTION OF THE DRAWING

FIG. 1 illustrates the operation of a depth indicator mounted in a boat;

FIG. 2 is a front view of the display of a depth indicator incorporating the presently preferred embodiment of the invention;

FIG. 3 is a sectional view taken along the line 3—3 of FIG. 2 and includes an electrical schematic;

FIG. 4 illustrates a typical display for the instrument operating at the normal rate; and FIG. 5 is a view similar to that of FIG. 4 showing operation at half the normal rate.

DESCRIPTION OF THE PREFERRED EMBODIMENT

In FIG. 1, a boat 10 rests in a body of water 11 above a bottom 12, with fish 13 in the water. The fish locator of the present invention is carried in the boat, with a transducer 16 mounted on the hull and connected to an electronics and display unit 17 via cable 18.

A typical display unit is shown in FIGS. 2 and 3 and includes a housing 20 with a front panel 21. There is an annular cutout 22 in the front panel, and a scale of 0 to 60 is provided around the cutout. A three position switch 23 provides for turning the system on and for selecting operation in feet or in fathoms, with the scale indicating depth of 0 to 60 feet or 0 to 60 fathoms, as selected. A gain control 24 and a rate selection switch 25 are also mounted on the housing.

A rotating indicator, typically a wheel 28 driven by a motor 29, is positioned behind the panel 21 with a light source 31 carried on the wheel and positioned for viewing through the opening 22. Typically the light source is an electric lamp or a light emitting diode.

The system includes a buffer amplifier 34, a transmitter 35, a receiver 36, a lamp driver 37 and a flip-flop 38.

A magnet 40 on the wheel 28 closes a reed switch 41 each revolution of the wheel 28 to provide a synchronization signal for the system. Typically the switch 41 is connected to circuit ground by the magnet 40 providing a grounded input to the buffer amplifier 34 which provides a trigger signal for the transmitter 35 which in turn provides an electrical input pulse to the ultrasonic transducer 16 generating a pressure wave in the water downward from the boat hull. The echoes picked up by the transducer are connected to the receiver 36 which provides an output through gain control potentiometer 24 to the lamp driver amplifier 37. Each ultrasonic echo of a magnitude above the threshold set for the system will produce a flash of the lamp. The timing for the synchronization signal preferably is selected so that the transmitte pressure pulse occurs when the lamp 31 is at the 0 position of the display.

FIG. 4 illustrates a typical display when operating the conventional system at high gain in water with a rocky bottom at 25 feet. A flash 42 produced by the transmitted pulse occurs at 0 to 2 feet. Several lamp flashes appear between 21 and 25 feet resulting from the echoes produced by the rocky bottom. Another group of flashes appear between 45 and 50 feet produced by the second echo, with a third group of flashes between 10 and 15 feet produced by the third echo. An experienced operator of the instrument usually can interpret such a display as indicating a rocky bottom at about 25 feet because of the relative intensity and duration of the lamp flashes. Normally, the gain of the system will be turned down to eliminate or substantially reduce the indication for the third echo and the second echo. However, if fish are in the depth range of 10 to 15 feet, the relatively weak echoes of the fish will be eliminated at the same time the third echo from the bottom is eliminated, with the resulting loss of desired information.

The fish locator of the present invention incorporates a logic circuit in the system which overcomes this disadvantage. In the preferred embodiment illustrated, the flip-flop 38 functions to inhibit transmitter and receiver operation during every other revolution of the indicator wheel 28 so that echoes occurring beyond the range of the display are not displayed. The transmitter trigger signal is also provided as an input to the flip-flop. One output of the flip-flop is connected as an inhibit signal to the transmitter and receiver and when the switch 25 is closed, the transmitter and receiver will be inhibited for every other trigger signal. With the switch 25 open, the conventional full rate of operation will occur.

FIG. 5 illustrates the display obtained under the same operating conditions as the display of FIG. 4, except for closing the switch 25. The bottom echo and the second echo are displayed as previously discussed, since they occur during the first revolution following the trigger signal. However the third echo is not displayed because the receiver has been inhibited during the second revolution of the indicator wheel following the trigger signal which produced the transmitted pulse. The fish 13 which are in the 9 to 12 foot depth range are now clearly identifiable on the display, whereas they had previously been masked by the third echo. The system is operating at high gain as with the display of FIG. 4. Another pulse is transmitted at the start of the third revolution, with the echoes displayed during the third revolution. There are no ambiguous echoes displayed during the third revolution because there was no transmitted pulse during the second revolution. Thus it is seen that the use of the logic circuit eliminates the ambiguities and masking problems previously encountered with the conventional depth indicators. While a logic circuit providing inhibiting for every other revolution of the wheel is preferred, it should be recognized that more complex logic circuits can be used to provide other sequences of operation.

I claim:

1. In an ultrasonic depth indicator for locating fish and the like, the combination of:
    an ultrasonic transducer;
    a transmitter for providing an electrical input to said transducer;
    a receiver for the electrical output of said transducer;
    an indicator;
    drive means for rotating said indicator;
    means for connecting said receiver output to said indicator for pulsing said indicator as a function of receiver outputs;
    synchronization means for generating a transmitter trigger signal in synchronism with indicator rotation providing a trigger signal for every revolution;
    a logic circuit having said trigger signal as an input and producing an inhibit signal as an output for predetermined input signals; and
    means for connecting said inhibit signal to said transmitter and receiver for inhibiting operation thereof.

2. An ultrasonic depth indicator as defined in claim 1 wherein said inhibit signal connecting means includes a switch for selectively connecting and disconnecting said inhibit signal permitting operation at partial rate and full rate, respectively.

3. An ultrasonic depth indicator as defined in claim 1 wherein said logic circuit includes a bistable circuit providing an inhibit signal for every other trigger signal.

* * * * *